United States Patent
Patil et al.

(10) Patent No.: US 10,257,696 B2
(45) Date of Patent: Apr. 9, 2019

(54) METHOD AND SYSTEM FOR SHARING DEVICE CAPABILITIES OF UNIVERSAL PLUG AND PLAY (UPNP) DEVICES WITH A SERVICE NETWORK ENTITY

(75) Inventors: Mayuresh Madhukar Patil, Bangalore (IN); Basavaraj Jayawant Pattan, Bangalore (IN); Venkateswar Jeedigunta, Bangalore (IN)

(73) Assignee: Samsung Electronics Co., Ltd (KR)

( * ) Notice: Subject to any disclaimer, the term of this patent is extended or adjusted under 35 U.S.C. 154(b) by 127 days.

(21) Appl. No.: 14/116,956

(22) PCT Filed: May 9, 2012

(86) PCT No.: PCT/KR2012/003650
§ 371 (c)(1),
(2), (4) Date: Nov. 11, 2013

(87) PCT Pub. No.: WO2012/153983
PCT Pub. Date: Nov. 15, 2012

(65) Prior Publication Data
US 2014/0094160 A1    Apr. 3, 2014

(30) Foreign Application Priority Data
May 9, 2011 (IN) .......................... 1609/CHE/2011

(51) Int. Cl.
*H04W 8/24* (2009.01)
*H04L 12/28* (2006.01)
(Continued)

(52) U.S. Cl.
CPC .......... *H04W 8/24* (2013.01); *H04L 12/2809* (2013.01); *H04L 12/2834* (2013.01);
(Continued)

(58) Field of Classification Search
CPC .......... H04L 12/2827; H04L 29/06027; H04L 12/2809; H04L 12/2838; H04L 12/2834; H04L 67/306; H04L 69/24; H04W 8/24
(Continued)

(56) References Cited

U.S. PATENT DOCUMENTS

2004/0052233 A1* 3/2004 Skog .................. H04M 1/7253
370/338
2005/0235048 A1* 10/2005 Costa-Requena ........................
H04L 29/06027
709/219
(Continued)

FOREIGN PATENT DOCUMENTS

KR    1020100021386    2/2010
WO    WO 2010/087748    8/2010

OTHER PUBLICATIONS

PCT/ISA/237 Written Opinion issued on PCT/KR2012/003650 (pp. 4).
(Continued)

*Primary Examiner* — David R Lazaro
*Assistant Examiner* — Zi Ye
(74) *Attorney, Agent, or Firm* — The Farrell Law Firm, P.C.

(57) ABSTRACT

Methods and apparatus are provided for sharing device capabilities of Universal Plug and Play (UPnP) devices with a service provider entity. Device capabilities of one or more UPnP devices in a UPnP home network environment are obtained. The device capabilities are aggregated. The aggregated device capabilities are mapped in a user agent profile. The user agent profile including the device capabilities is communicated to the service provider entity so that the
(Continued)

service provider entity delivers telephony services to the one or more UPnP devices according to respective device capabilities.

12 Claims, 9 Drawing Sheets

(51) Int. Cl.
    *H04L 29/08*     (2006.01)
    *H04M 1/253*     (2006.01)

(52) U.S. Cl.
    CPC ......... *H04L 67/306* (2013.01); *H04M 1/2535* (2013.01); *H04M 2250/06* (2013.01)

(58) Field of Classification Search
    USPC ...... 709/228, 217, 219; 379/93.15; 370/465; 726/1
    See application file for complete search history.

(56) References Cited

U.S. PATENT DOCUMENTS

| | | | |
|---|---|---|---|
| 2005/0289559 A1 | 12/2005 | Illowsky et al. | |
| 2006/0153072 A1* | 7/2006 | Bushmitch | H04L 12/2805 370/230 |
| 2008/0008114 A1* | 1/2008 | Kaarela | H04M 1/72527 370/328 |
| 2009/0028179 A1* | 1/2009 | Albal | G06Q 10/10 370/465 |
| 2009/0180484 A1 | 7/2009 | Igarashi | |
| 2009/0282458 A1* | 11/2009 | Hjelm | H04L 69/24 726/1 |
| 2010/0040211 A1* | 2/2010 | Maeng | H04L 12/2838 379/93.15 |
| 2010/0223339 A1 | 9/2010 | Cheng | |
| 2010/0262467 A1 | 10/2010 | Barnhill, Jr. et al. | |
| 2011/0002341 A1 | 1/2011 | Damola et al. | |
| 2011/0060994 A1 | 3/2011 | Maxwell et al. | |

OTHER PUBLICATIONS

PCT/ISA/210 Search Report issued on PCT/KR2012/003650 (pp. 4).
European Search Report dated Dec. 1, 2014 issued in counterpart application No. 12781646.0-1862.
Mahfuzur Rahman et al., "TelephonyArchitecture:1" For UPnP Version 1.0, Standardized DCP (SDCP), Mar. 22, 2011, 24 pages.
Korean Office Action dated Feb. 13, 2018 issued in counterpart application No. 10-2013-7032695, 17 pages.
"Wireless Application Group User Agent Profile Specification", Version 10, WAG UAPROF, XP-002962021, Nov. 10, 1999, 74 pages.
European Search Report dated Oct. 17, 2018 issued in counterpart application No. 12781646.0-1216, 9 pages.

* cited by examiner

METHOD AND SYSTEM FOR SHARING DEVICE CAPABILITIES OF UNIVERSAL PLUG AND PLAY (UPNP) DEVICES WITH A SERVICE NETWORK ENTITY

PRIORITY

This application is a National Phase Entry of PCT International Application No. PCT/KR2012/003650, which was filed on May 9, 2012, and claims priority to Indian Patent Application No. 1609/CHE/2011, which was filed on May 9, 2011, the contents of which are incorporated herein by reference.

BACKGROUND OF THE INVENTION

1. Field of the Invention

The present invention relates generally to the field of a Universal Plug and Play (UPnP) system, and more particularly, to sharing device capabilities of UPnP devices with a service provider entity.

2. Description of the Related Art

UPnP is a set of computer network protocols promulgated by the UPnP forum. Goals of UPnP are to allow access to connect seamlessly, and to simplify implementation of networks in home (e.g., data sharing, communications, and entertainment) and corporate environments. These goals are achieved by defining and publishing UPnP device control protocols built upon open, Internet-based communication standards.

UPnP technology can cater to a wide range of devices in a home network. UPnP technology provides discovery, control, and eventing mechanisms. Using these mechanisms, UPnP makes the availability and unavailability of the UPnP devices known to the other devices in the UPnP home network on the fly.

UPnP architecture allows peer-to-peer networking of Personal Computers (PCs), networked appliances, and wireless devices. It is a distributed, open architecture based on established standards such as, for example, Transport Control Protocol/Internet Protocol (TCP/IP), User Datagram Protocol (UDP), HyperText Transfer Protocol (HTTP), and eXtendible Mark-up Language (XML). The UPnP architecture supports zero configuration networking. For example, a UPnP compatible device from any vendor can dynamically join a network, obtain an Internet Protocol (IP) address, announce its name, convey its capabilities upon request, and learn about the presence and capabilities of other devices. On the other hand, the UPnP devices can leave the UPnP home network automatically without leaving any unwanted state information.

The foundation of UPnP networking is IP addressing. Each UPnP device includes a Dynamic Host Configuration Protocol (DHCP) client, which searches for a DHCP server when the UPnP device is first connected to the UPnP network. If no DHCP server is available, the UPnP device assigns itself an IP address. If, during the DHCP transaction, the UPnP device obtains a domain name, for example, through a Domain Name System (DNS) server or via DNS forwarding, the UPnP device uses that name in subsequent network operations. If the UPnP device does not obtain a domain name, the UPnP device uses its IP address.

The UPnP forum also provides telephony services for extending user experience in a home to access telephony services such as, for example, a messaging service, a presence service, and a call handling (PS/CS call) service. As analogous to UPnP Device Architecture (DA), the UPnP telephony defines three kinds of devices: a Telephony Server (TS) that provides messaging and presence related services to the user, a Telephony Control Point (TelCP) to initiate actions provided by the TS, and a Telephony Client device (TC) for media related handling and providing input to and output from the TS.

UPnP telephony has defined an interface that allows telephony user to access telephony services using non-telephony devices. Therefore, in the UPnP home network environment, the telephony user may extend telephony services to UPnP devices such as, for example, non-telephony devices (e.g., television). Currently, telephony services delivered on the non-telephony devices may render a poor user experience to the telephony user, since the service provider is not aware of capabilities of the non-telephony devices in an UPnP home network environment. Typically, device capabilities are provided to the service provider via a User agent Profile (UaProf) provided by the Open Mobile Alliance (OMA). However, existing user agent profile does not allow the telephony user to communicate device capabilities of UPnP devices (i.e., non-telephony devices) with the service provider

SUMMARY OF THE INVENTION

The present invention has been made to address at least the above problems and/or disadvantages and to provide at least the advantages described below. Accordingly, an aspect of the present invention provides a method and an apparatus for sharing device capabilities of UPnP devices with a service network entity.

According to one aspect of the present invention, a method is provided for sharing device capabilities of UPnP devices with a service provider entity. Device capabilities of one or more UPnP devices in a UPnP home network environment are obtained. The device capabilities are aggregated. The aggregated device capabilities are mapped in a user agent profile. The user agent profile including the device capabilities is communicated to the service provider entity so that the service provider entity delivers telephony services to the one or more UPnP devices according to respective device capabilities.

According to another aspect of the present invention, an apparatus is provided for sharing device capabilities of UPnP devices with a service provider entity. The apparatus includes a processor, and a memory coupled to the processor. The memory includes a device capabilities manager configured for: obtaining device capabilities of one or more UPnP devices in a UPnP home network environment; aggregating the device capabilities; mapping the aggregated device capabilities in a user agent profile; and communicating the user agent profile including the device capabilities to the service provider entity so that the service provider entity delivers telephony services to the one or more UPnP devices according to respective device capabilities.

According to an additional aspect of the present invention, a system is provided for sharing device capabilities of telephony clients with a service provider entity. The system includes one or more telephony clients. The system also includes a telephony control point connected to the one or more telephony clients and configured for: obtaining device capabilities of the one or more telephony clients in a UPnP home network environment; and aggregating the device capabilities. The system further includes a telephony server connected to the telephony control point and configured for: mapping the aggregated device capabilities in a user agent profile; and communicating the user agent profile including the device capabilities to the service provider entity so that the service provider entity delivers telephony services to the one or more telephony clients according to respective device capabilities.

According to a further aspect of the present invention, a system is provided for sharing device capabilities of telephony control points with a service provider entity. The system includes one or more telephony control points. The system also includes a telephony server connected to the one or more telephony control points and configured for: obtaining device capabilities of the one or more telephony control points in a UPnP home network environment; aggregating the device capabilities; mapping the aggregated device capabilities in a user agent profile; and communicating the user agent profile containing the device capabilities to the service provider entity so that the service provider entity delivers telephony services to the one or more telephony control points according to respective device capabilities.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
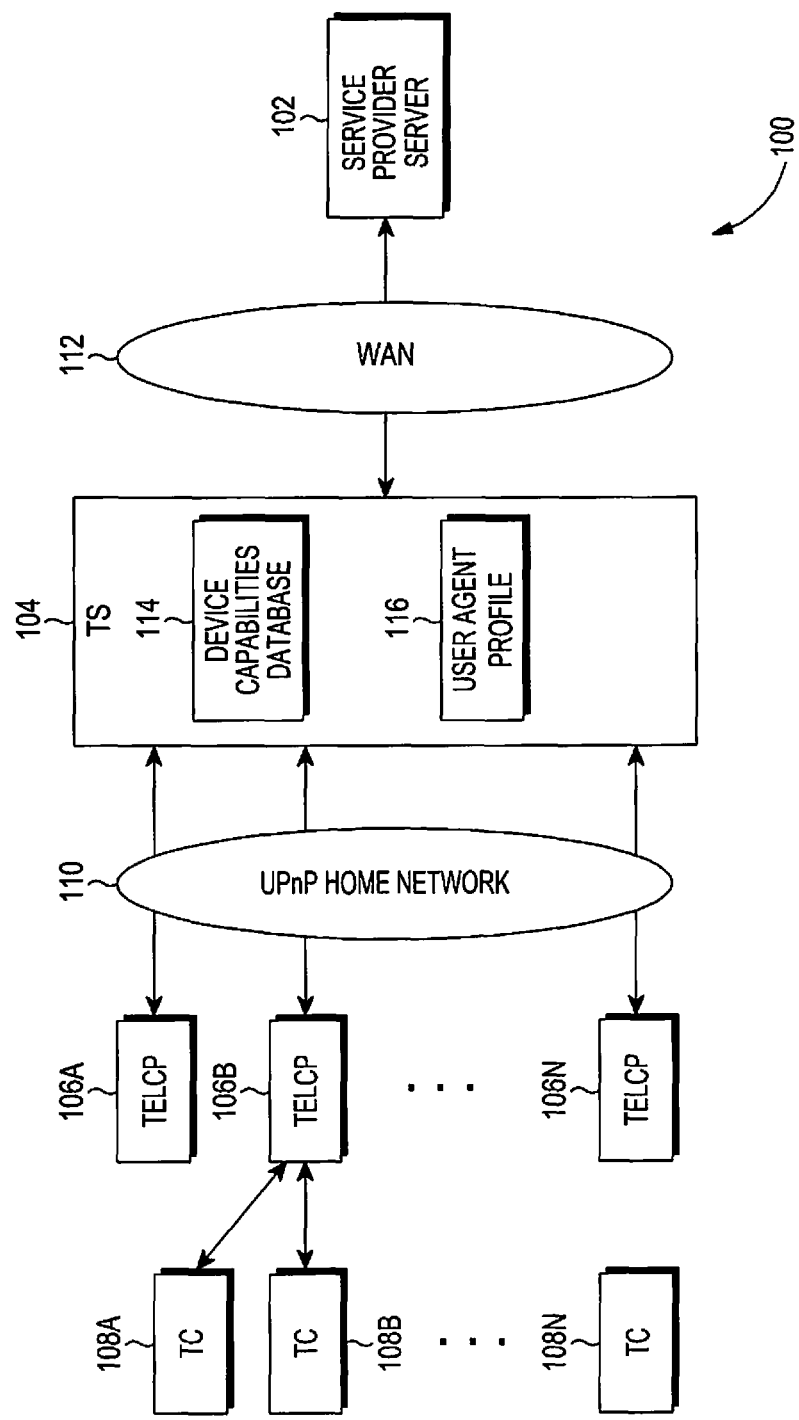
FIG. 1 is a block diagram illustrating a system for sharing device capabilities associated with UPnP devices with a service provider server, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide a method and system of sharing device capabilities of UPnP devices with a service provider entity.

FIG. 1 is a block diagram illustrating a system 100 for sharing device capabilities associated with UPnP devices with a service provider entity, according to an embodiment of the present invention. In FIG. 1, the system 100 includes a service provider server 102, a TS 104, TelCPs 106A-N and TCs 108A-N. In the system 100, the TS 104, the TelCPs 106A-N and the TCs 108A-N belong to a UPnP home network environment, and communicate with each other using UPnP protocol.

The TS 104 may include a telephony device such as, for example, a smart phone, a Personal Digital Assistant (PDA), a tablet PC, and the like, capable of communicating with the TelCPs 106A-N and the service provider server 102. The TelCPs 106A-N and the TCs 108A-N may include telephony devices and non-telephony devices such as, for example, mobile phones, tablets, televisions, sound system, displays, and similar devices. It is appreciated that the non-telephony devices such as, for example, television, displays, and sound system, may have distinct devices capabilities as compared to the telephony devices. The term 'device capabilities' refers to hardware capabilities, connectivity capabilities, input/output capabilities, and software capabilities of UPnP devices (e.g., TelCPs 106A-N and TCs 108A-N) in the UPnP home network environment. Exemplary device capabilities are shown in Table 1 below.

TABLE 1

| Setting Name | Type | Description and usage |
|---|---|---|
| /UPnP/PHONE/ConnectedDevices/ | SingleInstance | The element stores the information of the devices that are connected to the TS. |
| /UPnP/PHONE/ConnectedDevices/Device/#/ | MultiInstance | The element stores the device information. |
| DeviceType | String | Identifies type of device. The allowed values are: MobileTabletTVPCImplementation can add more specific elements. |
| /UPnP/PHONE/ConnectedDevices/Device/#/Hardware/ | SingleInstance | This element stores hardware capabilities of the device. |
| AvailableMemory | String | Identifies if the device has memory storage capability. This represents the size as a string. For e.g: "None", "32 GB" |
| Battery | Boolean | Identifies if device is using battery. |
| Microphone | Boolean | Identifies if device has the microphone functionality. |
| Speaker | Boolean | Identifies if device has the speaker functionality. |
| /UPnP/PHONE/ConnectedDevice/Device/#/Hardware/Display/ | SingleInstance | This element stores display capabilities of the device. |
| DisplayType | String | This element represents the type of the display. The allowed values are: Projector LCDLEDImplementation can add more specific elements. |
| Resolution | String | This element represents the resolution of the screen e.g., "720p". |
| 3D Support | Boolean | This elements represents if the display supports 3D capabilities of not. |
| /UPnP/PHONE/ConnectedDevices/Device/#/Hardware/Camera/ | SingleInstance | This element stores camera capabilities of the device. |

TABLE 1-continued

| Setting Name | Type | Description and usage |
|---|---|---|
| Resolution | Integer | This element represents the resolution of the camera. The resolution is represented as an integer in size of mega pixel. E.g., 8, 10 etc. |
| FlashSupport | Boolean | This represents if device is having flash capabilities or not. |
| /UPnP/PHONE/ConnectedDevices/Device/#/Hardware/UserInterface/ | SingleInstance | This element stores user interface supported by the device. |
| Touch | Boolean | This identifies if device is touch capable. |
| Key-Pad | Boolean | This identifies if device supports keypad. |
| KeyBoard | Boolean | This identifies if device supports full keyboard. |
| PointingDevice | Boolean | This identifies if device supports any pointing device like mouse. |
| /UPnP/PHONE/ConnectedDevices/Device/#/Software/ | SingleInstance | This element stores hardware capabilities of the device. |
| /UPnP/PHONE/ConnectedDevices/Device/#/Software/OS/ | SingleInstance | Identifies the OS details of the device. |
| OSname | String | Represents the name of the OS, like Android/Windows. |
| OS version | String | Version of the OS. |
| Vendor | String | This optionally represents the vendor information of the OS. |
| /UPnP/PHONE/ConnectedDevices/Device/#/Software/Push/ | SingleInstance | Identifies the OS details of the device. |
| PushAppIDs | String | Identifies the push application supported by the device. |
| /UPnP/PHONE/ConnectedDevices/Device/#/Software/MediaSupports/ | SingleInstance | Identifies the Media supported by the device. |
| Audio | Boolean | Identifies if device can handle audio. |
| Video | Boolean | Identifies if device can handle video. |
| MIMETYPE | String | This optional element will be used to represent the supported MIMETYPE by the device. |

The TS 104 is connected to the service provider server 102 via a Wireless Area Network (WAN) 112, and the TelCPs 106A-N are connected to the TS 104 via a UPnP network 110.

In the UPnP home network environment, different types of UPnP devices are connected together. The information associated with the different connected devices can be exposed to the service provider server, which enriches a communication service experience of the telephony users. The service provider server 102 can take advantage of the device capabilities for providing telephony services. For example, if TS 104 is connected with a High Definition (HD) capable TV, then a peer can initiate a HD Call with the home user.

Figure 6A:
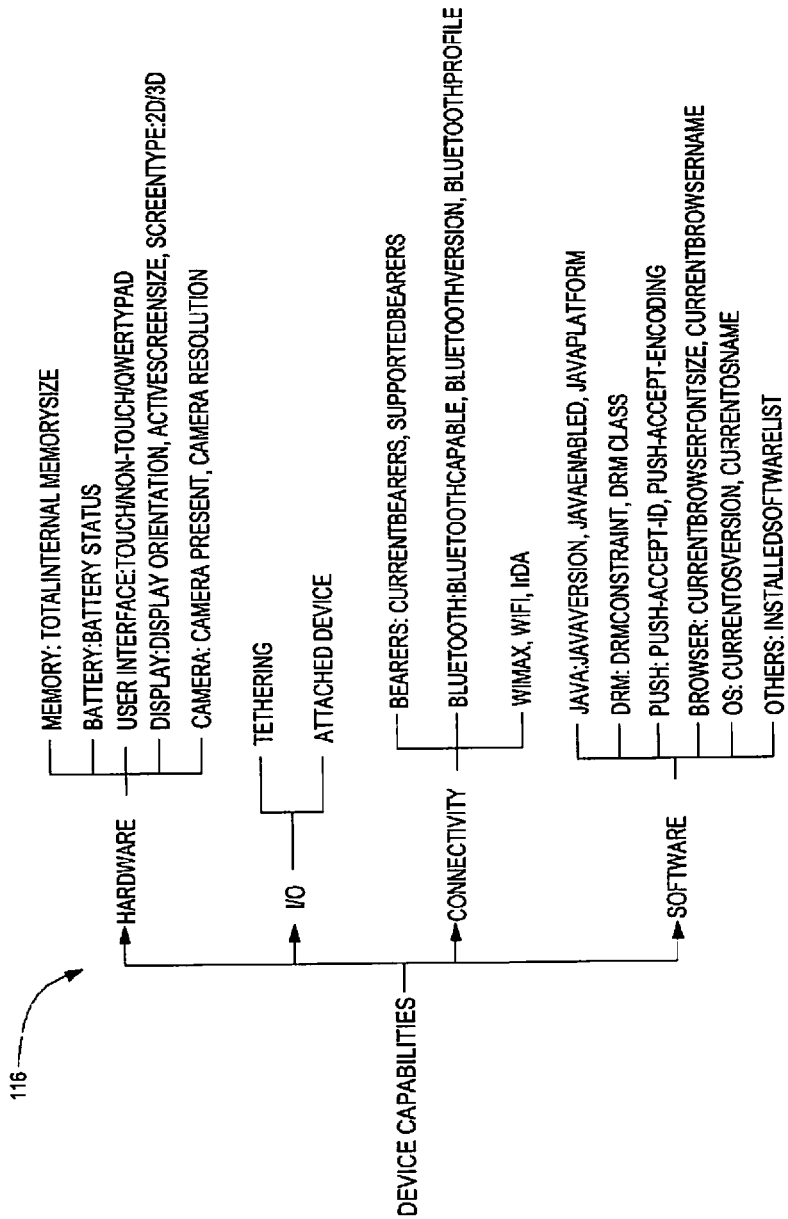
FIG. 6A is a schematic representation illustrating a user agent profile with device capabilities of UPnP devices, according to an embodiment of the present invention.
Figure 6B:
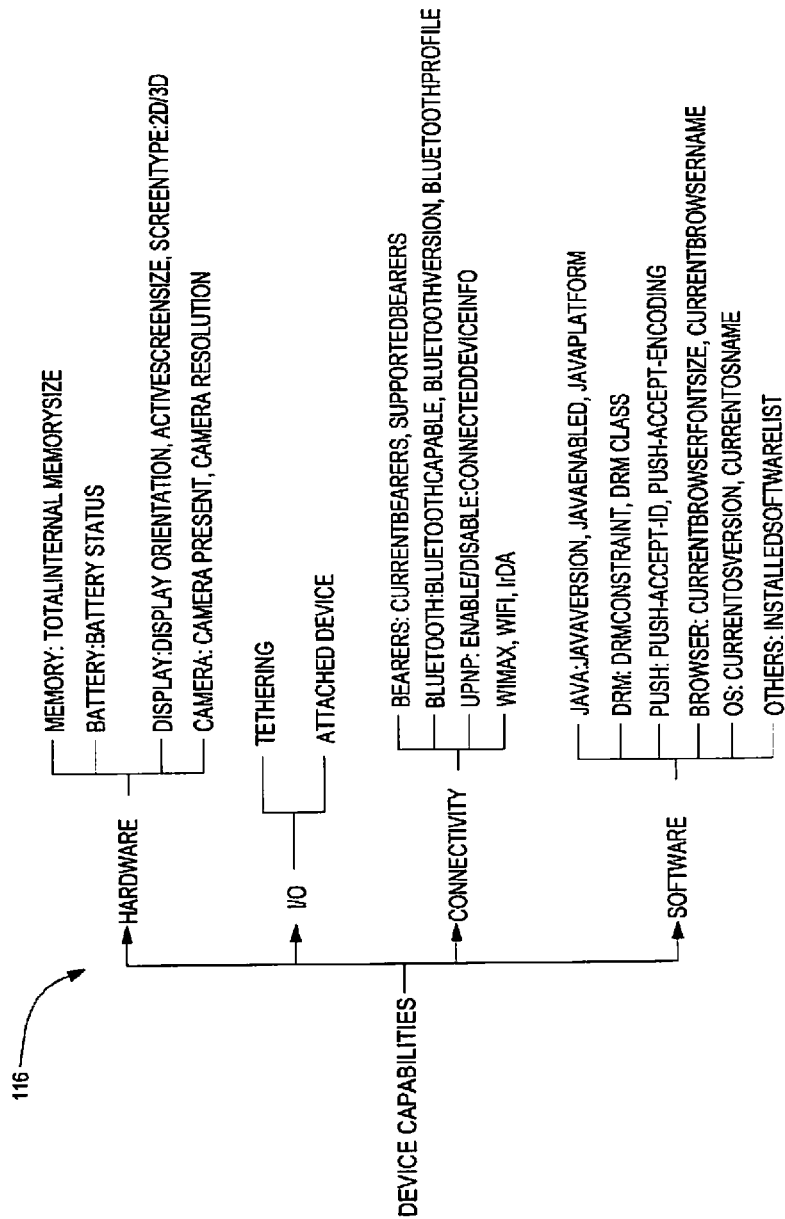
FIG. 6B is a schematic representation illustrating a user agent profile, according to an embodiment of the present invention.

According to an embodiment of the present invention, the TelCPs 106A-N obtain device capabilities of respective TCs, and send the device capabilities to the TS 104. In this embodiment of the present invention, the TS 104 shares the device capabilities associated with the TCs 108A-N with the service provider server 102 in a user agent profile 116 so that the service provider server 102 provides telephony services to the TCs 108A-N according to the respective device capabilities. In OMA standard, a UaProf allows a user's mobile device to share device capabilities with a service provider. In an embodiment of the present invention, the TS 104 uses a modified user agent profile 116 for sharing device capabilities of the UPnP devices. The modified user agent profile 116 containing the device capabilities are illustrated in FIGS. 6A and 6B. The process of retrieving and sharing device capabilities of TCs with the service provider server 102 is described in greater detail below with respect in FIG. 2.

Figure 2:
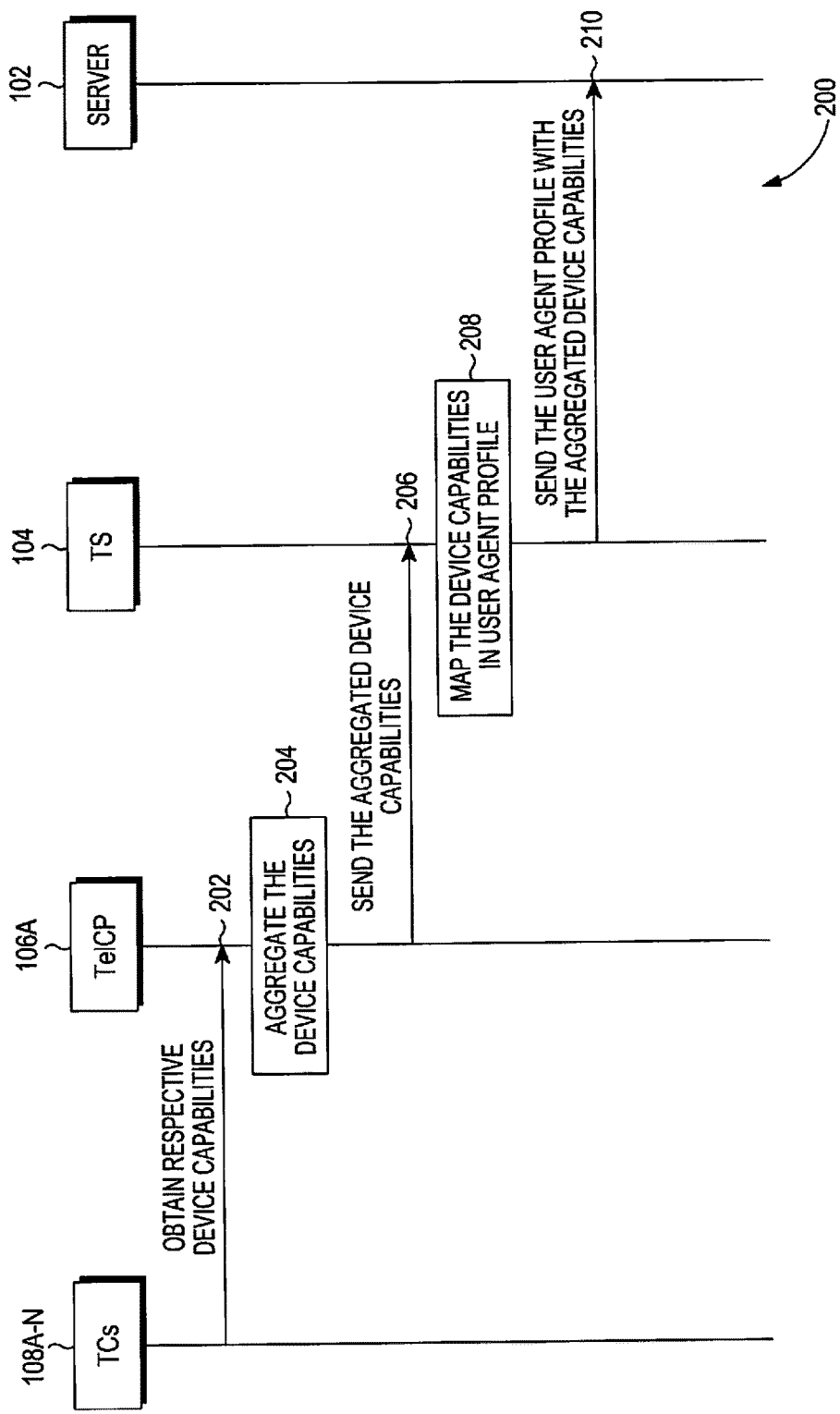
FIG. 2 is a flow diagram illustrating a method of sharing device capabilities associated with UPnP devices with the service provider server, according to an embodiment of the present invention.
Figure 5:
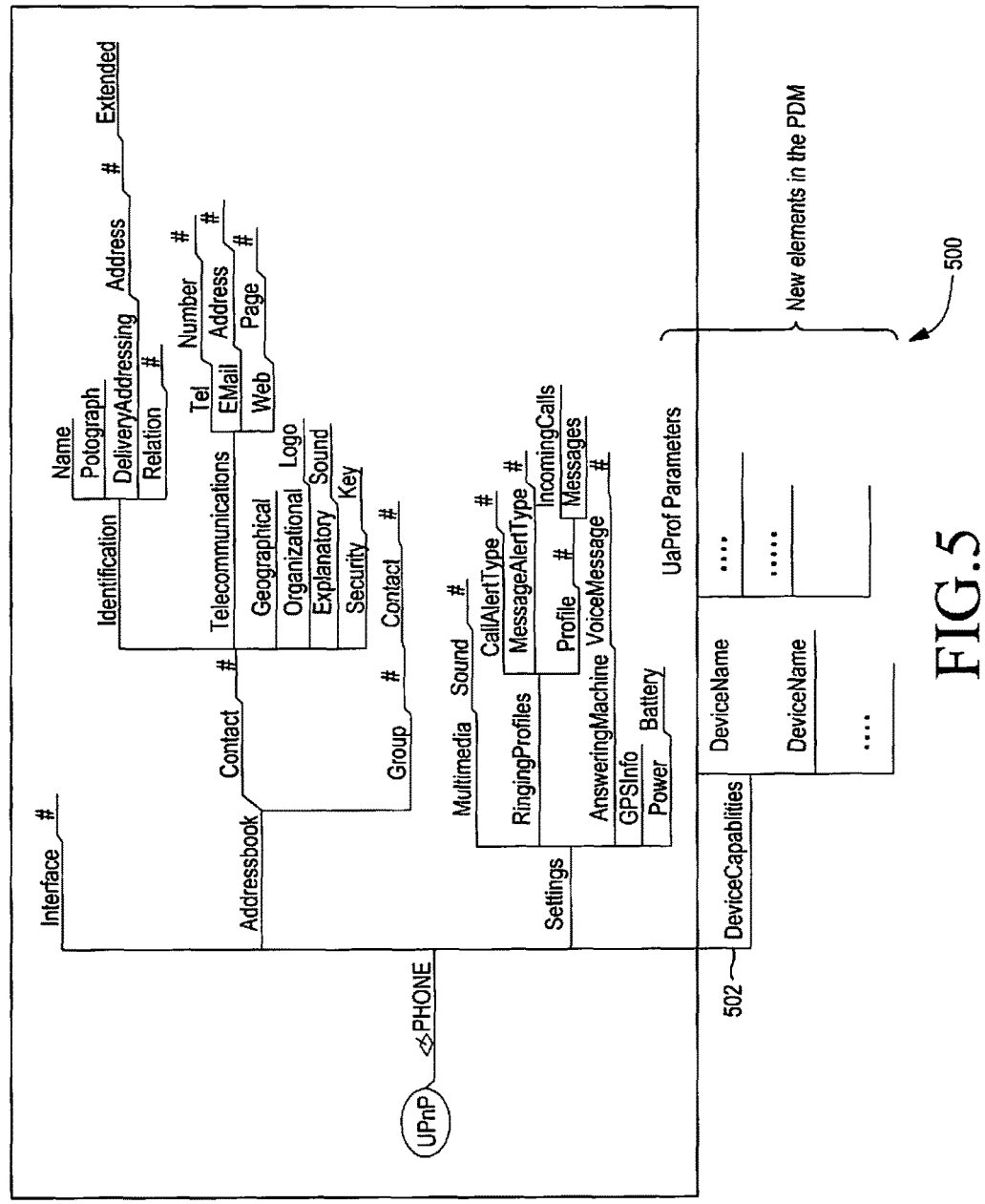
FIG. 5 is a schematic representation illustrating a phone data model containing device capabilities of UPnP devices, according to an embodiment of the present invention.

Referring now to FIG. 2, a flow diagram illustrates a method 200 of sharing device capabilities associated with UPnP devices with the service provider server, according to an embodiment of the present invention. In step 202, the TelCP 106A obtains device capabilities associated with the TCs 108A-N, from the TCs 108A-N. In step 204, the TelCP 106A aggregates the device capabilities associated with the TCs 108A-N. In step 206, the TelCP 106A sends the aggregated device capabilities associated with the TCs 108A-N to the TS 104. The TS 104 stores the aggregated device capabilities in the device capabilities database 114. In an embodiment of the present invention, the TS 104 stores the aggregated device capabilities in a phone data model. A phone data model including device capabilities is shown in FIG. 5. In another embodiment of the present invention, the TS 104 stores the aggregated device capabilities in a home network profile.

In step 208, the TS 104 maps the aggregated device capabilities to a user agent profile 116. At step 210, the TS 104 sends the user agent profile 116 indicating the aggregated device capabilities associated with the TCs 108A-N to the service provider server 102. Thus, based on the device capabilities in the user agent profile 116, the service provider server 102 delivers telephony services on the TCs 108A-N. This helps enhance an overall telephony experience of the telephony user.

Figure 3:
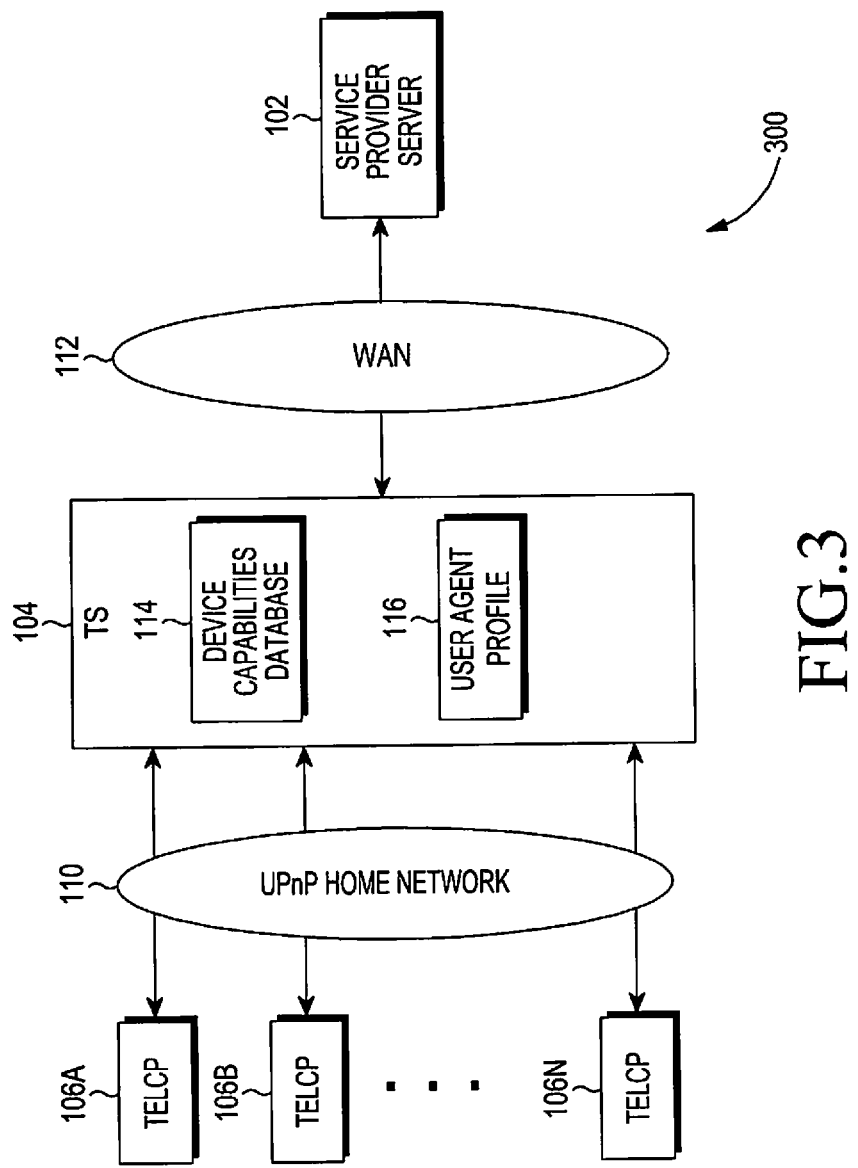
FIG. 3 is a block diagram illustrating a system for sharing device capabilities of TelCPs with the service provider server, according to an embodiment of the present invention.

FIG. 3 is a block diagram illustrating a system 300 for sharing device capabilities of TelCPs with the service provider server 102, according to an embodiment of the present invention. A system 300 of FIG. 3 is similar to the system 100 of FIG. 1, except the system 300 does not include the TCs 108A-N in the home network environment.

According to an embodiment of the present invention, the TS 104 obtains device capabilities of TelCPs 106A-N and shares the device capabilities associated with the TelCPs 106A-N with the service provider server 102 in the user agent profile 116 so that the service provider server 102 provides telephony services to the TelCPs 106A-N according to the respective device capabilities. The user agent profile 116 containing the device capabilities is illustrated in FIGS. 6A and 6B. The process of retrieving and sharing device capabilities of TelCPs with the service provider server 102 is described in greater detail below with respect to FIG. 4.

Figure 4:
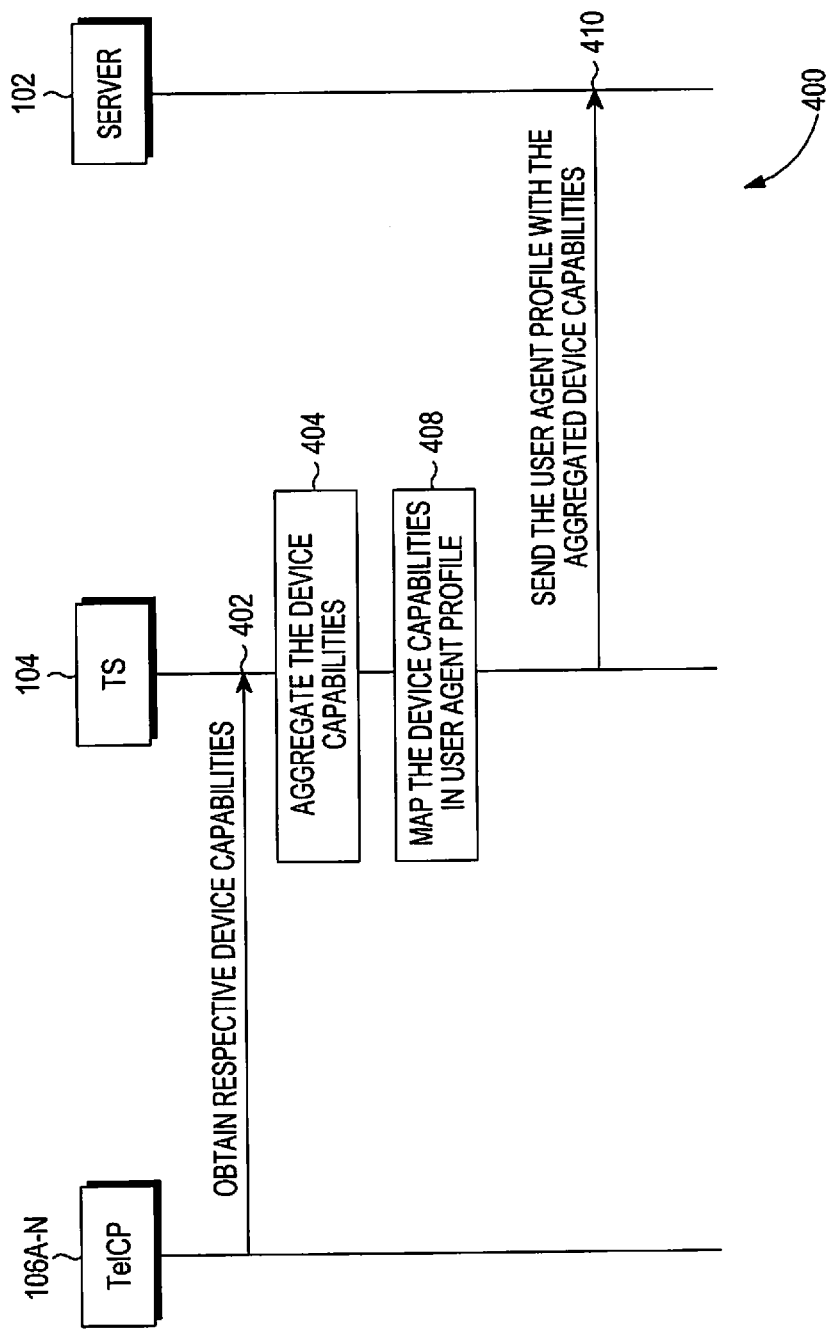
FIG. 4 is a flow diagram illustrating a method of sharing device capabilities associated with UPnP devices with the service provider server, according to an embodiment of the present invention

Referring now to FIG. 4, a flow diagram illustrates a method of sharing device capabilities associated with UPnP devices with the service provider server, according to an embodiment of the present invention. In step 402, the TS 104 obtains device capabilities associated with the TelCPs 106A-N. In step 404, the TS 104 aggregates the device capabilities associated with the TelCPs 106A-N. The TS 104 stores the aggregated device capabilities in the device capabilities database 114. In an embodiment of the present invention, the TS 104 stores the aggregated device capabilities in a phone data model. A phone data model including device capabilities is shown in FIG. 5. In another embodiment of the present invention, the TS 104 stores the aggregated device capabilities in a home network profile.

In step 408, the TS 104 maps the aggregated device capabilities to a user agent profile 116. In step 410, the TS 104 sends the user agent profile 116 indicating the aggregated device capabilities associated with the TelCPs 106A-N to the service provider server 102. Thus, based on the device capabilities in the user agent profile 116, the service provider server 102 delivers telephony services on the TelCPs 106A-N. This helps enhance an overall telephony experience of the telephony user.

In accordance with the foregoing description, the TS 104 is configured for dynamically updating changes to the device capabilities of UPnP devices in the device capabilities database 114, and communicating the updates to the device capabilities to the service provider server 102.

FIG. 5 is a schematic representation illustrating a phone data model 500 containing device capabilities of UPnP devices (e.g., TCs 108A-N and TelCPs 106A-N), according to an embodiment of the present invention. According to an embodiment of the present invention, device capabilities associated with UPnP devices are stored in the phone data model 500. This embodiment of the present invention defines elements to store the device information and capabilities information of the UPnP devices in the phone data model 500. The phone data model 500 includes a new element 'AttachedDeviceCapabilities' 502 for storing device capabilities of UPnP devices. For example, the element 'DeviceCapabilities' 502 includes one or more sub elements named 'DeviceName'. Each sub element represents device capabilities of a single UPnP device. Each sub element may have further sub elements for capturing various types of device capabilities (e.g., hardware, software, input/output, connectivity, etc.). In an embodiment of the present invention, the TS 104/TelCP 106A can store device capabilities in the phone data model using a Call Management Service (CMS) service. For example, the GetValues( ) and SetValues( ) CMS actions can be used to manage these information elements in the phone data model 500.

FIG. 6A is a schematic representation illustrating a user agent profile 116 with device capabilities of UPnP devices, according to an embodiment of the present invention. In FIG. 6A, representation of device capabilities stored in the phone data model 500 in the user agent profile 116 is depicted. The device capabilities of the UPnP devices are mapped to single capabilities in the user agent profile 116. Additional device capabilities can be included in the user agent profile 116 by defining new elements in the user agent profile 116. For example, in the user agent profile 116, a new element is added under connectivity capability to include capabilities such as Worldwide interoperability for Microwave Access (WiMAX), Wireless Fidelity (WiFi), Infrared Data Association (IrDA), etc.

FIG. 6B is a schematic representation illustrating a user agent profile 116, according to an embodiment of the present invention. In FIG. 6B, the connectivity element in the user agent profile 116 is modified to indicate UPnP support. This enables the service provider server 102 know about the support for UPnP telephony service. In one implementation, the user agent profile 116 may include new elements UPnP, Telephony, and Deviceinfo for indicating device capabilities of the UPnP devices in the user agent profile 116.

Figure 7:
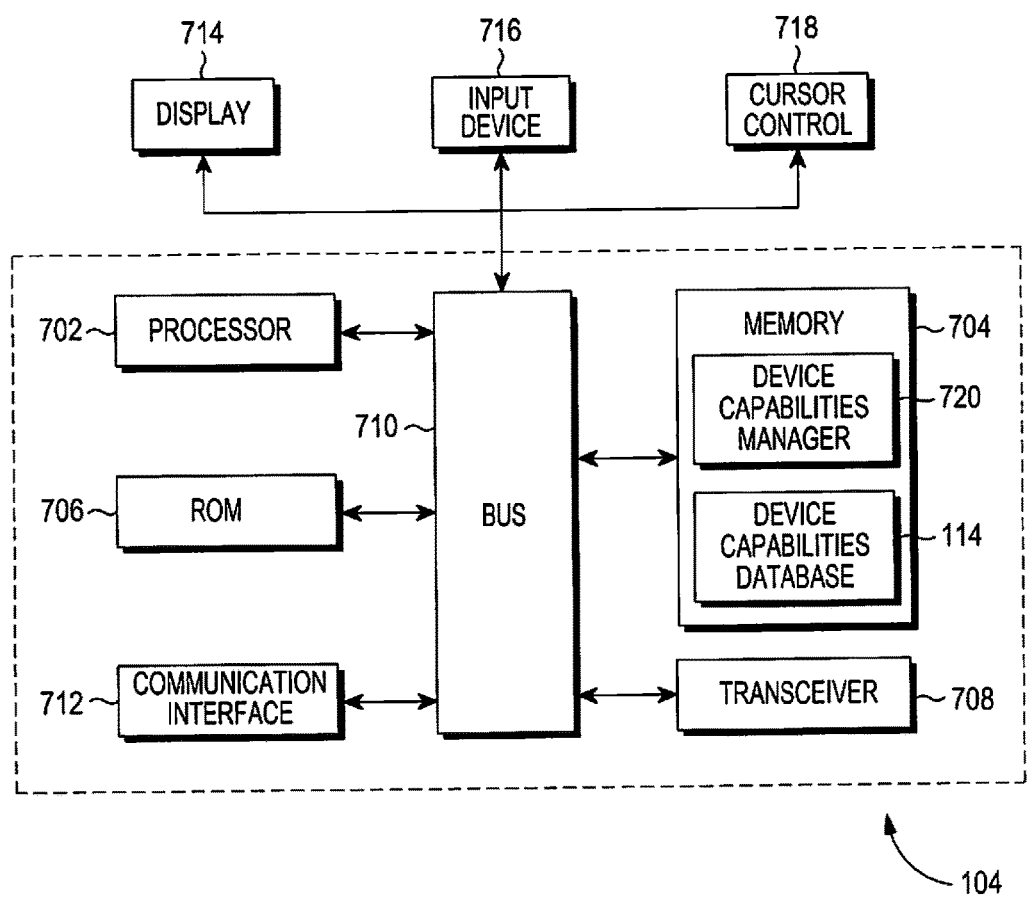
FIG. 7 is a block diagram illustrating a telephony server showing various components, according to an embodiment of the present invention.

FIG. 7 is a block diagram illustrating the TS 104 showing various components, according to an embodiment of the present invention. In FIG. 7, the TS 104 includes a processor 702, a memory 704, a Read Only Memory (ROM) 706, a transceiver 708, a bus 710, a communication interface 712, a display 714, an input device 716, and a cursor control 718.

The processor 702, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 702 may also include embedded controllers, such as generic or programmable logic devices or arrays, application specific integrated circuits, single-chip computers, smart cards, and the like.

The memory 704 may be a volatile memory and/or a non-volatile memory. The memory 704 includes a device capabilities manager 720 and the device capabilities database 114, according to embodiments of the present invention. For example, the device capabilities manager 720 obtains device capabilities associated with UPnP devices (e.g., TelCPs 106A-N and/or TCs 108A-N) and stores the device capabilities in the device capabilities database 114. Also, the device capabilities manager 720 sends the device capabilities to the service provider server 102 in a user agent profile.

A variety of computer-readable storage media may be stored in and accessed from the memory elements. Memory elements may include any suitable memory device(s) for storing data and machine-readable instructions, such as ROM, Random Access Memory (RAM), Erasable Programmable ROM (EPROM), Electrically EPROM (EEPROM), hard drive, removable media drive for handling memory cards, Memory Sticks™, and the like.

Embodiments of the present invention may be implemented in conjunction with modules, including functions, procedures, data structures, and application programs, for performing tasks, or defining abstract data types or low-level hardware contexts. The device capabilities manager 720 may be stored in the form of machine-readable instructions on any of the above-mentioned storage media and executed by the processor 702. For example, a computer program may include machine-readable instructions capable of retrieving device capabilities of UPnP devices and providing the device capabilities to the service provider server 102 in a user agent profile, according to the teachings and described embodiments of the present invention. In an embodiment of the present invention, the computer program may be included on a storage medium and loaded from the storage medium to a hard drive in the non-volatile memory.

Components such as the transceiver 708, the communication interface 712, the display 714, the input device 716, and the cursor control 718 are well known to those of ordinary skill in the art.

Figure 8:
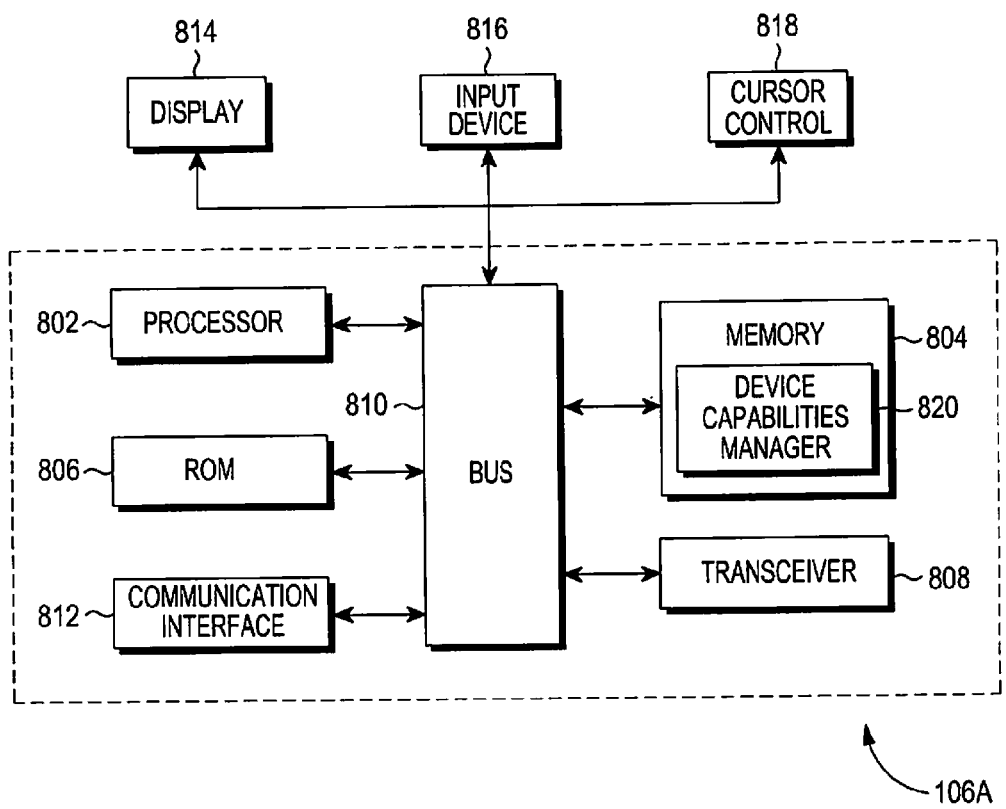
FIG. 8 is a block diagram illustrating a telephony control point showing various components, according to an embodiment of the present invention.

FIG. 8 is a block diagram illustrating the TelCP 106A showing various components, according to an embodiment of the present invention. In FIG. 8, the TelCP 106A includes a processor 802, a memory 804, a ROM 806, a transceiver 808, a bus 810, a communication interface 812, a display 814, an input device 816, and a cursor control 818.

The processor 802, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 802 may also include embedded controllers, such as generic or programmable logic devices or arrays, application specific integrated circuits, single-chip computers, smart cards, and the like.

The memory 804 may be a volatile memory and/or a non-volatile memory. The memory 804 includes a device capabilities manager 820, according to an embodiment of the present invention. For example, the device capabilities manager 820 is configured for obtaining device capabilities associated with UPnP devices (e.g., TCs 108A-N) and sends the device capabilities to the TS 104.

A variety of computer-readable storage media may be stored in and accessed from the memory elements. Memory elements may include any suitable memory device(s) for storing data and machine-readable instructions, such as ROM, RAM, EPROM, EEPROM, hard drive, removable media drive for handling memory cards, Memory Sticks™, and the like.

Embodiments of the present invention may be implemented in conjunction with modules, including functions, procedures, data structures, and application programs, for performing tasks, or defining abstract data types or low-level hardware contexts. The device capabilities manager 820 may be stored in the form of machine-readable instructions on any of the above-mentioned storage media and executed by the processor 802. For example, a computer program may include machine-readable instructions capable of retrieving device capabilities of the TCs 108A-N and providing the device capabilities to the TS 104, according to the teachings and described embodiments of the present invention. In one embodiment of the present invention, the computer program may be included on a storage medium and loaded from the storage medium to a hard drive in the non-volatile memory.

Components such as the transceiver 808, the communication interface 812, the display 814, the input device 816, and the cursor control 818 are known to those of ordinary skill in the art.

Various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the invention has been shown and described with reference to certain preferred embodiments thereof, it will be understood by those skilled in the art that various changes in form and detail may be made therein without departing from the spirit and scope of the invention as defined by the appended claims.

The invention claimed is:

1. A method for sharing device capabilities of devices connected with a telephony server in a home network with a service provider entity, the method comprising the steps of:
   acquiring, by the telephony server, the device capabilities of the devices;
   updating, by the telephony server, a phone data model including parameters for phone management by using a call management service (CMS) action, wherein the phone data model includes one or more elements, each of the elements includes one or more sub elements, and each of the sub elements may include further sub elements;
   associating, by the telephony server, the acquired device capabilities with the parameters in the phone data model to generate an updated phone data model, the phone data model including features of the telephony server; and
   transmitting, by the telephony server, the updated phone data model and the features of the telephony server, to the service provider entity providing a telephony service, which is delivered, by the service provider entity, to a telephony user via at least one of the devices based on respective device capabilities,
   wherein the devices include one or more telephony devices connected to the telephony server and one or more non-telephony devices connected to the telephony server, and
   wherein the device capabilities include display capability of the devices and camera capability of the devices.

2. The method of claim 1, wherein the phone data model indicates that the phone data model comprises the device capabilities of the devices connected to the telephony server.

3. The method of claim 1, wherein the device capabilities comprise at least one of hardware capabilities, interface capabilities, connectivity capabilities, and software capabilities.

4. The method of claim 1, further comprising:
   dynamically updating the device capabilities of the devices stored in the phone data model.

5. The method of claim 1, wherein the predetermined protocol is universal plug and play (UPnP).

6. The method of claim 1, wherein the phone data model indicates that the phone data model comprises the device capabilities of the devices connected to the telephony server.

7. The method of claim 1, wherein the parameters are managed by the telephony server by profiling the CMS.

8. An apparatus in a telephony server for sharing device capabilities of devices connected with a telephony server in a home network with a service provider entity, the apparatus comprising:
   a processor; and
   a memory coupled to the processor, wherein the processor is configured for:
      acquiring the device capabilities of the devices;
      updating, by the telephony server, a phone data model including parameters for phone management by using a call management service (CMS) action, wherein the phone data model includes one or more elements, each of the elements includes one or more sub elements, and each of the sub elements may include further sub elements;
      associating the acquired device capabilities with the parameters in the phone data model to generate an updated phone data model, the phone data model including features of the telephony server; and
      transmitting the updated phone data model and the features of the telephony server, to the service provider entity providing a telephony service, which is delivered, by the service provider entity, to a telephony user via at least one of the devices based on respective device capabilities,
   wherein the devices include one or more telephony devices connected to the telephony server and one or more non-telephony devices connected to the telephony server, and wherein the device capabilities include display capability of the devices and camera capability of the devices.

9. The apparatus of claim 8, wherein the device capabilities comprise at least one of hardware capabilities, interface capabilities, connectivity capabilities, and software capabilities.

10. The apparatus of claim 8, wherein the processor is configured for dynamically updating the device capabilities of the devices stored in the phone data model.

11. The apparatus of claim 8, wherein the predetermined protocol is universal plug and play (UPnP).

12. The apparatus of claim 8, wherein the phone data model indicates that the phone data model comprises the device capabilities of the devices connected to a telephony server.

* * * * *